US008544268B2

(12) United States Patent
Begin

(10) Patent No.: US 8,544,268 B2
(45) Date of Patent: Oct. 1, 2013

(54) ENGINE ASSEMBLY INCLUDING TURBOCHARGER

(75) Inventor: Louis P. Begin, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 13/115,500

(22) Filed: May 25, 2011

(65) Prior Publication Data

US 2012/0301278 A1   Nov. 29, 2012

(51) Int. Cl.
| | |
|---|---|
| F02B 33/44 | (2006.01) |
| F04B 17/00 | (2006.01) |
| F04B 35/00 | (2006.01) |
| F01D 25/18 | (2006.01) |
| F16C 19/00 | (2006.01) |
| B28B 21/72 | (2006.01) |

(52) U.S. Cl.
USPC ........ 60/605.1; 60/605.3; 417/407; 184/6.11; 384/464; 428/34.4

(58) Field of Classification Search
USPC ............... 60/605.1, 605.3; 417/406–407; 415/122.1, 200, 160, 175; 264/624; 428/34.4; 184/6.11; 384/464
IPC ... F02B 37/00, 39/00; F16C 17/02, 32/04; F25J 3/04
See application file for complete search history.

(56) References Cited

U.S. PATENT DOCUMENTS

| | | | | |
|---|---|---|---|---|
| 1,724,902 | A * | 8/1929 | Bentley | 384/464 |
| 2,911,138 | A * | 11/1959 | Birmann | 417/406 |
| 2,973,136 | A * | 2/1961 | Greenwald | 417/407 |
| 3,038,318 | A * | 6/1962 | Hanny | 417/407 |
| 3,068,638 | A * | 12/1962 | Birmann | 60/605.1 |
| 3,632,222 | A * | 1/1972 | Cronstedt | 415/122.1 |
| 3,740,163 | A * | 6/1973 | Schinnerer et al. | 417/407 |
| 3,814,549 | A * | 6/1974 | Cronstedt | 417/406 |
| 3,834,156 | A * | 9/1974 | Cutler et al. | 417/407 |
| 4,355,850 | A * | 10/1982 | Okano | 417/407 |

(Continued)

FOREIGN PATENT DOCUMENTS

| | | | |
|---|---|---|---|
| CN | 201428510 Y | * | 3/2010 |
| CN | 201433816 Y | * | 3/2010 |

(Continued)

OTHER PUBLICATIONS

MiTi Developments, Oil-Free Turbocharger Demonstration Paves Way to Gas Turbine Engine Applications, Mohawk Innovative Technology, Inc., Spring 1999, vol. 6, 4 pages.

(Continued)

Primary Examiner — Thai Ba Trieu
(74) Attorney, Agent, or Firm — Harness, Dickey & Pierce, P.L.C.

(57) ABSTRACT

A turbocharger includes a housing, a first rotor wheel, a second rotor wheel, a driveshaft, a first bearing and a second bearing. The housing defines a first region, a second region, an intake air inlet, an intake air outlet and an exhaust gas inlet. The first rotor wheel is located in the first region and the second rotor wheel is located in the second region. The first bearing is located on a first axial side of the first rotor wheel axially between the first and second rotor wheels and supports the driveshaft for rotation relative to the housing. The second bearing is located on a second axial side of the first rotor wheel and supports the first rotor wheel for rotation relative to the housing.

17 Claims, 2 Drawing Sheets

(56) References Cited

U.S. PATENT DOCUMENTS

| | | | |
|---|---|---|---|
| 4,756,664 A * | 7/1988 | Cohen et al. | 415/175 |
| 5,025,629 A * | 6/1991 | Woollenweber | 415/160 |
| 5,787,711 A * | 8/1998 | Woollenweber et al. | 417/407 |
| 5,810,556 A * | 9/1998 | Northam et al. | 415/200 |
| 5,900,089 A * | 5/1999 | Northam et al. | 415/200 |
| 6,001,436 A * | 12/1999 | Strasser et al. | 428/34.4 |
| 6,238,617 B1 * | 5/2001 | Strasser et al. | 264/624 |
| 6,327,857 B1 * | 12/2001 | Fredriksson | 60/605.3 |
| 6,457,311 B2 * | 10/2002 | Fledersbacher et al. | 60/605.3 |
| 6,571,563 B2 * | 6/2003 | Yim et al. | 415/126 |
| 6,966,191 B2 * | 11/2005 | Fukutani et al. | 60/785 |
| 6,997,686 B2 * | 2/2006 | Agrawal et al. | 417/350 |
| 7,055,303 B2 * | 6/2006 | Macfarlane et al. | 184/6.11 |
| 7,108,488 B2 * | 9/2006 | Larue et al. | 417/407 |
| 7,175,385 B2 * | 2/2007 | Aschenbruck et al. | 415/107 |
| 7,360,361 B2 * | 4/2008 | Prusinski et al. | 60/605.3 |
| 7,571,607 B2 * | 8/2009 | Vrbas | 60/605.1 |
| 2006/0225419 A1 * | 10/2006 | Prusinski et al. | 60/605.1 |
| 2011/0197849 A1 * | 8/2011 | Wright | 123/241 |

FOREIGN PATENT DOCUMENTS

| | | | |
|---|---|---|---|
| CN | 201943761 U | * | 8/2011 |
| CN | 102434712 A | * | 5/2012 |
| JP | 58206825 A | * | 12/1983 |
| JP | 61142328 A | * | 6/1986 |
| JP | 2000002481 A | * | 1/2000 |
| JP | 2005248856 A | * | 9/2005 |
| WO | WO2009115149 A1 | * | 9/2009 |

OTHER PUBLICATIONS

Agrawal, Girl L., Foil Air/Gas Bearing Technology—An Overview, The American Society of Mechanical Engineers, Publication 97-GT-347, 1997, 11 pages.

Ishino, Minoru, Air Bearing for Automotive Turbocharger, Jul. 3, 2006, 1 page.

Wade, Jonathan L. et al., Successful Oil-Free Version of a Gas Compressor Through Integrated Design of Foil Bearings, Proceedings of ASME Turbo Expo 2008: Power for Land, Sea and Air, GT2008-50349, Jun. 9-13, 2008, Berlin, Germany, 5 pages.

* cited by examiner

ENGINE ASSEMBLY INCLUDING TURBOCHARGER

FIELD

The present disclosure relates to engine intake air flow arrangements.

BACKGROUND

This section provides background information related to the present disclosure which is not necessarily prior art.

Internal combustion engines may combust a mixture of air and fuel in cylinders and thereby produce drive torque. Combustion of the air-fuel mixture produces exhaust gases. Engines may include intake ports to direct air flow to the combustion chambers and exhaust ports to direct exhaust gases from the combustion chambers. An intake assembly may be used to direct air flow to the intake ports.

SUMMARY

An engine assembly may include an engine structure and a turbocharger. The engine structure may define an intake port and an exhaust port. The turbocharger may include a housing, a first rotor wheel, a second rotor wheel, a driveshaft, a first bearing and a second bearing. The housing may define a first region, a second region, an intake air inlet in communication with an air source, an intake air outlet in communication with the intake port and an exhaust gas inlet in communication with the exhaust port. The first rotor wheel may be located in the first region and the second rotor wheel may be located in the second region. The driveshaft may extend between and may be coupled to the first rotor wheel and the second rotor wheel. The first bearing may be located on a first axial side of the first rotor wheel axially between the first and second rotor wheels, coupled to the housing and supporting the driveshaft for rotation relative to the housing. The second bearing may be located on a second axial side of the first rotor wheel, coupled to the housing and supporting the first rotor wheel for rotation relative to the housing.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
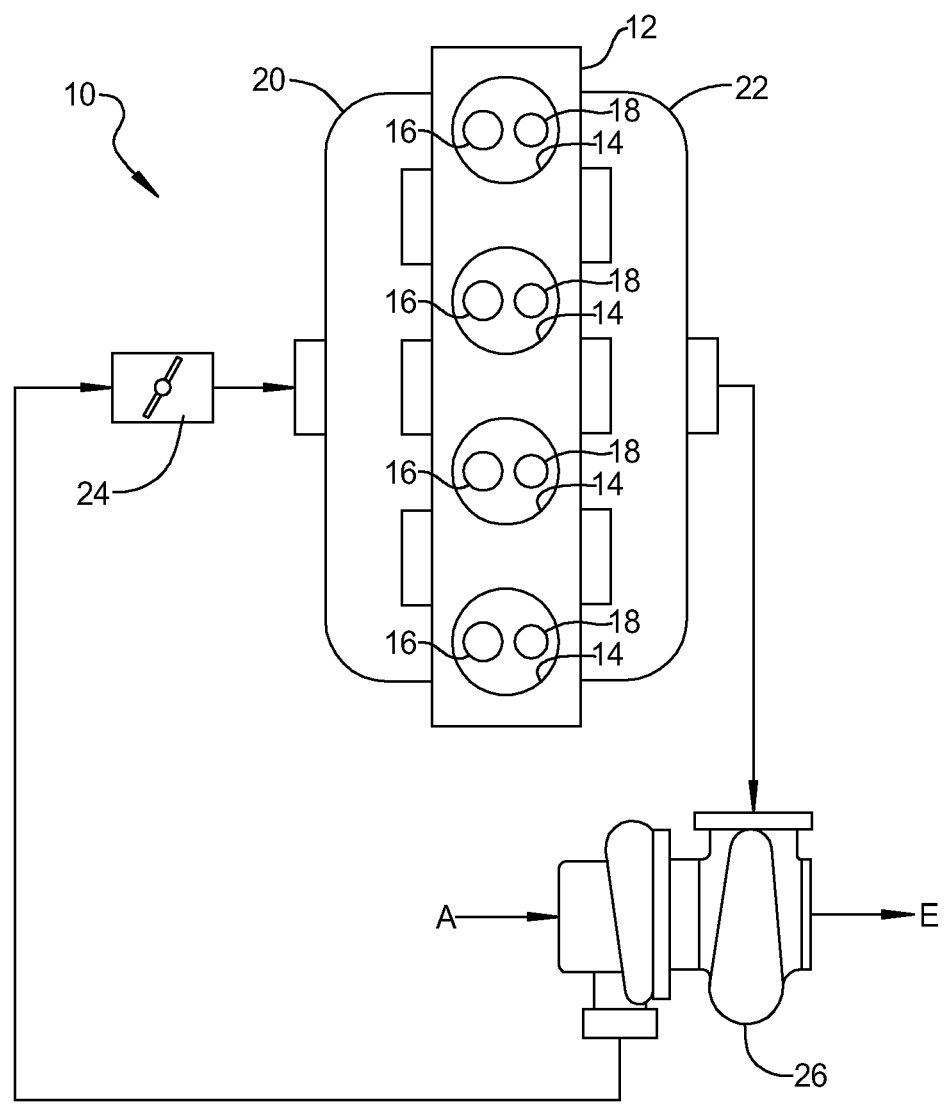
FIG. 1 is a schematic illustration of an engine assembly according to the present disclosure.

An engine assembly 10 is illustrated in FIG. 1 and may include an engine structure 12 defining cylinders 14 and intake and exhaust ports 16, 18 in communication with the cylinders 14, an intake manifold 20, exhaust manifold 22, a throttle valve 24 and a turbocharger 26. The engine assembly 10 is illustrated as an inline four cylinder arrangement for simplicity. However, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

The turbocharger 26 may include a housing 28, a compression mechanism 30, a first bearing 32 and a second bearing 34. The housing 28 may define first and second regions 36, 38, an intake air inlet 40, an intake air outlet 42, an exhaust gas inlet 44 and an exhaust gas outlet 46. The first region 36 may include first, second and third members 37, 39, 41 coupled to one another. The first region 36 may form an intake air region in communication with the intake air inlet 40 and the intake air outlet 42. More specifically, the first member 37 may define the intake air inlet 40 and the third member 41 may define the intake air outlet 42.

The second region 38 may form an exhaust gas region in communication with the exhaust gas inlet 44 and the exhaust gas outlet 46. The intake air inlet 40 may be in communication with an air source (A) and the intake air outlet 42 may be in communication with the intake manifold 20. The exhaust gas inlet 44 may be in communication with the exhaust manifold 22 and the exhaust gas outlet 46 may provide exhaust gas (E) from the engine to atmosphere.

The compression mechanism 30 may include a first rotor wheel 48, a second rotor wheel 50 and a drive shaft 52. The first rotor wheel 48 may be located in the first region 36 and may form a compressor wheel. The second rotor wheel 50 may be located in the second region 38 and may form a turbine wheel rotationally driven by the exhaust gas (E). The drive shaft 52 may extend between and may be coupled to the first and second rotor wheels 48, 50.

The first and second bearings 32, 34 may be coupled to the housing 28 and may rotationally support the first and second rotor wheels 48, 50 and drive shaft 52 relative to the housing 28. The first bearing 32 may be located on a first axial side 54 of the first rotor wheel 48 axially between the first and second rotor wheels 48, 50. The second bearing 34 may be located on a second axial side 56 of the first rotor wheel 48 opposite the first axial side 54. Locating the first rotor wheel 48 between the first and second bearings 32, 34 may improve rotor dynamic behavior.

The second bearing 34 may be located in the first region 36 of the housing 28. The first and second members 37, 39 of the housing 28 may be formed from a composite material to minimize noise generation at the second bearing 34. The third member 41 may additionally be formed from the composite material.

The first bearing 32 may form an oil-free bearing and provide radial support for the drive shaft 52. In the present non-limiting example, the first bearing 32 is schematically illustrated and includes an air bearing or a magnetic bearing (such as a permanent magnet bearing). The second bearing 34 may form a thrust bearing at the second axial side 56 of the first rotor wheel 48 and may provide both radial and axial support for the drive shaft 52. In the present non-limiting example, the second bearing 34 includes ball bearings 58 retained between an inner ring 60 coupled to the drive shaft 52 and an outer ring 62 coupled to the housing 28. The second bearing 34 may be press fit onto the drive shaft 52. The end of the drive shaft 52 supporting the second bearing 34 may define a hollow bore 63 to accommodate the press fit engagement between the second bearing 34 and the drive shaft 52.

A steel liner 64 including a hardened thrust retainer may be located between the housing 28 and the outer ring 62 and secured to the housing 28 by struts 66. A spring 68 may bias the second bearing 34 axially outward relative to the second axial side 56 of the first rotor wheel 48. The second bearing 34 may be biased into engagement with an axial stop (for the inner ring 60) defined by a nut 70 fixed to an end of the drive shaft 52 and an axial stop (for the outer ring 62) defined by the steel liner 64.

A hydraulic mount 72 may be formed between the steel liner 64 and the outer ring 62. The hydraulic mount 72 may define an oil distribution annulus 74 providing oil at the outer ring 62. The first region 36 of the housing 28 may define an oil feed 76 to the second bearing 34. The oil feed 76 may include a tube having a first outlet 78 in communication with the oil distribution annulus 74 and a second outlet 80 forming an oil jet providing oil to the ball bearings 58. The drive shaft 52 may include an oil deflector 82 located axially between the second bearing 34 and the first rotor wheel 48.

A seal 84 may be located on the drive shaft 52 axially between the oil deflector 82 and the first rotor wheel 48 to isolate oil from the intake air flow (A). The oil deflector 82 may deflect oil from the seal 84. The housing 28 may include guide vanes 86 located in the intake air flow path between the intake air inlet 40 and the first rotor wheel 48 to direct the intake air flow (A) to the first rotor wheel 48.

Figure 2:
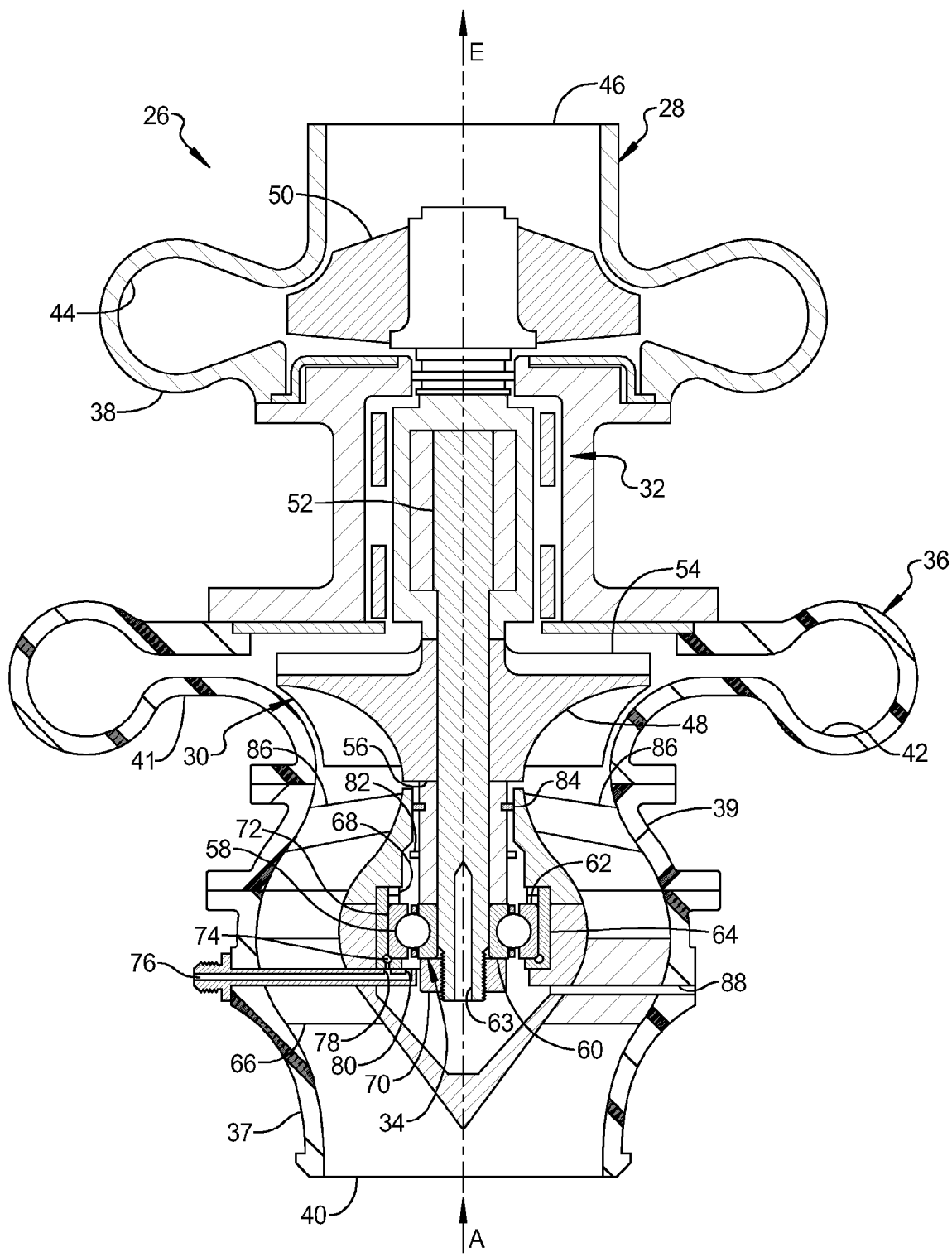
FIG. 2 is a schematic section illustration of the turbocharger shown in FIG. 1.

The arrangement of the turbocharger 26 discussed above may provide for angled orientation of the turbocharger 26 relative to a gravitational direction. More specifically, the first region 36 may be located below the second region 38 in a gravitational direction. The gravitational direction may generally be defined as a direction toward the ground (i.e., toward the wheels of a vehicle including the engine assembly 10). By way of non-limiting example, the arrangement of the turbocharger 26 provides for a nose-down orientation as seen in FIG. 2. The housing 28 may define an oil outlet 88 at an end of the first region 36. The nose-down orientation of the turbocharger 26 may provide for use of a single seal (e.g., seal 84). The orientation may keep the oil away from the seal 84 while also providing a preload on the second bearing 34.

What is claimed is:

1. A turbocharger comprising:
   a housing defining a first region and a second region;
   a compression mechanism including:
      a compressor rotor wheel located in the first region;
      a turbine rotor wheel located in the second region; and
      a drive shaft extending between and coupled to the compressor rotor wheel and the turbine rotor wheel;
   a first bearing located on a first axial side of the compressor rotor wheel axially between the compressor and turbine rotor wheels, coupled to the housing and supporting the drive shaft for rotation relative to the housing; and
   a second bearing located on a second axial side of the compressor rotor wheel, coupled to the housing and supporting the compressor rotor wheel for rotation relative to the housing, wherein the housing defines an oil feed to the second bearing, said oil feed having a first outlet in communication with an oil distribution annulus of the second bearing and a second outlet forming an oil jet providing oil to a ball bearing set of the second bearing, and an oil drain at an end of the first region of the housing supporting the second bearing.

2. The turbocharger of claim 1, wherein the first bearing provides radial support for the drive shaft and the second bearing provides radial and axial support for the drive shaft at the second axial side of the compressor rotor wheel.

3. The turbocharger of claim 1, further comprising guide vanes located within the first region of the housing axially between an air inlet and the compressor rotor wheel.

4. The turbocharger of claim 3, wherein the guide vanes are located axially between the second bearing and the compressor rotor wheel.

5. The turbocharger of claim 4, wherein the first bearing includes an air bearing or a magnetic bearing.

6. The turbocharger of claim 1, wherein the first bearing is an oil-free bearing.

7. The turbocharger of claim 1, wherein the housing is formed from a composite material.

8. An engine assembly comprising:
   an engine structure defining an intake port and an exhaust port; and
   a turbocharger including:
      a housing defining a first region, a second region, an intake air inlet in communication with an air source, an intake air outlet in communication with the intake port and an exhaust gas inlet in communication with the exhaust port;
      a compressor rotor wheel located in the first region;
      a turbine rotor wheel located in the second region;
      a drive shaft extending between and coupled to the compressor rotor wheel and the turbine rotor wheel;
      a first bearing located on a first axial side of the compressor rotor wheel axially between the compressor and turbine rotor wheels, coupled to the housing and supporting the drive shaft for rotation relative to the housing; and a second bearing located on a second axial side of the compressor rotor wheel, coupled to the housing and supporting the compressor rotor wheel for rotation relative to the housing, wherein the housing defines an oil feed to the second bearing including a first outlet in communication with an oil distribution annulus of the second bearing and a second outlet forming an oil jet providing oil to a ball bearing set of the second bearing and an oil drain at an end of the first region of the housing supporting the second bearing, said drive shaft including an oil deflector extending radially outward from the shaft and located axially between the second bearing and the compressor rotor wheel.

9. The engine assembly of claim 8, wherein the first bearing provides radial support for the drive shaft and the second bearing provides radial and axial support for the drive shaft at the second axial side of the compressor rotor wheel.

10. The engine assembly of claim 8, wherein the intake air inlet and the intake air outlet are in communication with the first region of the housing, the exhaust gas inlet is in communication with the second region of the housing.

11. The engine assembly of claim 10, wherein the turbocharger includes guide vanes located within the first region of the housing axially between the intake air inlet and the compressor rotor wheel.

12. The engine assembly of claim 11, wherein the guide vanes are located axially between the second bearing and the compressor rotor wheel.

13. The engine assembly of claim 8, wherein the turbocharger is oriented with the first region located below the second region.

14. The engine assembly of claim 8, wherein the first bearing is an oil-free bearing.

15. The engine assembly of claim 8, wherein the first bearing includes an air bearing or a magnetic bearing.

16. The engine assembly of claim 8, wherein the housing is formed from a composite material.

17. An engine assembly comprising:
an engine structure defining an intake port and an exhaust port; and
a turbocharger including:
a housing defining an intake air region, an exhaust gas region, an intake air inlet in communication with an air source, an intake air outlet in communication with the intake port and an exhaust gas inlet in communication with the exhaust port;
a compressor wheel located in the intake air region;
a turbine wheel located in the exhaust gas region;
a drive shaft extending between and coupled to the compressor wheel and the turbine wheel;
an air bearing located on a first axial side of the compressor wheel axially between the compressor wheel and the turbine wheel, coupled to the housing and supporting the drive shaft radially for rotation relative to the housing; and
a thrust bearing located on a second axial side of the compressor wheel, coupled to the housing and supporting the compressor wheel radially and axially for rotation relative to the housing, wherein the housing defines an oil feed to the thrust bearing, said oil feed having a first outlet in communication with an oil distribution annulus of the second bearing and a second outlet forming an oil jet providing oil to a ball bearing set of the thrust bearing, and an oil drain at an end of the intake air region of the housing supporting the thrust bearing, said drive shaft including an oil deflector extending radially outward from the shaft and located axially between the second bearing and the compressor rotor wheel.

* * * * *